United States Patent
Ryba et al.

(10) Patent No.: US 10,381,797 B1
(45) Date of Patent: Aug. 13, 2019

(54) FLEXIBLE DESIGN FOR A TUNABLE OPTICAL FILTER (TOF) PROCESSING BLOCK

(71) Applicant: BAE Systems Information and Electronic Systems Integration Inc., Nashua, NH (US)

(72) Inventors: Martin F Ryba, Acton, MA (US); Robert T Carlson, Bedford, NH (US); Steven G Santee, Bristow, VA (US); Forrest C Vatter, Bedford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/001,225

(22) Filed: Jun. 6, 2018

(51) Int. Cl.
*H01S 3/10* (2006.01)
*G02B 5/28* (2006.01)
*H01S 3/00* (2006.01)
*H04W 72/04* (2009.01)

(52) U.S. Cl.
CPC .............. *H01S 3/1003* (2013.01); *G02B 5/28* (2013.01); *H01S 3/0078* (2013.01); *H04W 72/0453* (2013.01)

(58) Field of Classification Search
CPC ............................ H01S 3/1003; H01S 3/0078
See application file for complete search history.

(56) References Cited

U.S. PATENT DOCUMENTS

| 6,291,813 B1 * | 9/2001 | Ackerman | ............ H01S 5/0687 250/214 R |
| 6,495,816 B1 * | 12/2002 | Brodeur | .................... G01J 1/44 250/214 LA |
| 2009/0060497 A1 * | 3/2009 | Way | ..................... H04B 10/675 398/27 |
| 2016/0380696 A1 * | 12/2016 | Deng | ............... H04B 10/07957 398/25 |

* cited by examiner

*Primary Examiner* — Eric L Bolda
(74) *Attorney, Agent, or Firm* — Maine Cernota & Rardin

(57) ABSTRACT

A flexible TOF processing block having power measurement circuitry comprising separate modules that can be modified using parameterizable registers, without complete reconstruction, allows development to continue while the overall design is optimized.

19 Claims, 7 Drawing Sheets

FLEXIBLE DESIGN FOR A TUNABLE OPTICAL FILTER (TOF) PROCESSING BLOCK

FIELD OF THE DISCLOSURE

The disclosure relates to wireless telecommunications, and more particularly, to wireless laser communications.

BACKGROUND OF THE DISCLOSURE

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless", as used herein, excludes fiber optic communication as well as communication over copper wires.

Traditional communication by wireless radio frequencies suffers from several shortcomings, many of which arise from the wide geographic dispersion of typical radio emissions (e.g. side lobes). Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. So-called "multi-user" detection can also be employed to further distinguish signals transmitted on overlapping frequencies. The geographic range of wireless signals may also be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Given these limitations, laser communication, or "laser-com," offers an attractive wireless alternative to radio communication, especially when point-to-point communication is required. Notably, the non-dispersed, focused character of laser communication intrinsically avoids most of the problems that are associated with radio communication. In particular, there is no need to assign frequency bands to laser-com users, because interference between laser signal beams is avoided so long as two beams are not directed to the same recipient. Laser signals experience very little attenuation as a function of distance, because the signal energy remains tightly focused in a beam. Communication security is also intrinsically high, as the interception of and interference with laser communications requires direct interception of a laser communication beam and/or focusing jamming beams directly at an intended signal receiver.

One important application that can benefit significantly from laser-com is satellite communications, where line-of-sight access is generally available, and where the communication distances are very great. Laser-com can provide communication data rates for satellites that are much higher than radio data rates, with unmatched anti-jam characteristics and an inherently low risk of communications intercept. Laser-com also eliminates the need for frequency planning and authorization, and circumvents the highly congested RF spectrum bandwidth constraints that limit the practical data rates available to users of RF links.

With reference to FIG. 1, laser communications holds great promise for multi-Gbps (Giga-bits per second) connections between space platforms 100, as well as between ground-based nodes 102 and space platforms 100, owing to the availability of efficient, multi-watt laser sources and exceedingly high antenna gain, having beam widths of only 10-20 micro-radians and telescope apertures that are only four to eight inches in diameter. Even when much lower data rates of tens to hundreds of mega-bits per second (Mbps) are of interest, laser-com may be desirable due to its inherent Low Probability of Intercept (LPI), Low Probability of Detection (LPD), and anti-jam characteristics.

It should be noted that the disclosure herein is mainly presented with reference to satellite communication. However, it will be understood by those of skill in the art that the present disclosure is not limited to satellite communication, but also applies to other implementations of laser communication.

Of course, there are certain problems associated with laser communication that arise specifically from the focused nature of laser beams. In particular, it is necessary for communicating nodes to identify each other and align their lasers so as to effectively communicate. In the case of satellite laser-com, these identification and alignment problems are especially acute, because laser sources that are well separated by terrestrial standards, for example several miles apart from each other, may nevertheless appear to be almost geographically overlapping from the viewpoint of a satellite. Furthermore, thermal and other atmospheric effects can lead to both frequency (wave length) and angular (apparent location) shifting of an incident laser communication beam, even after it is identified and aligned. The angular vibrational effects, together with other short-term mechanical instabilities of the satellite or other receiving node, are referred to herein collectively as "jitter."

With reference to FIG. 2, there are at least four steps to establish and maintain laser communications. First, a candidate light source, referred to herein as a "hot spot," is identified from within a scene of interest 200. Second, the hot spot is verified as being a communication signal and its transmission source is identified so as to determine if it is a signal of interest 202. Third, the optics of the laser-com receiving system is aligned with the incoming beam 204. Finally, once communication has been established, the beam is tracked during communication so that the alignment is maintained and the communication is not interrupted 206.

The present disclosure is mostly directed to the fourth 206 of the steps of FIG. 2, wherein there is a need for a more rapid and reliable apparatus and method for maintaining a laser communication ("laser-com") signal within a center of band while avoiding corruption from other signals.

SUMMARY OF THE DISCLOSURE

Tunable Optical Filters ("TOFs") are used to select a wavelength of interest from an optical fiber. They may be thought of as adjustable optical "band pass filters" whose purpose is to improve the Signal to Noise Ratio (SNR) of light input to a receive modem. In embodiments, the TOF is built from a Fiber Fabry-Perot (FFP) interferometer.

Generally, a combination of analog and digital circuitry is required to control a TOF, as the algorithm required for the control logic is too computationally intensive and timing-specific to be implemented entirely in software. However, it can also be difficult to specify a specific algorithm definitively without extensive analysis and/or bread boarding, thereby delaying development of other long-lead items, such as Application-Specific Integrated Circuits (ASICs), which are also required to complete the system. A solution discussed herein is to utilize a TOF Processing Block that is flexible enough to implement a variety of control algorithms in configurable software, yet robust enough to offload most of the processing, so as not to burden system hardware tasked with running that software.

In embodiments, the algorithms implemented on the TOF Processing Block are designed to maintain a TOF center frequency to maximize the total power entering a modem. Thus, in embodiments, the TOF Processing Block, via a TOF Controller Module, finds and tracks the maximum photodiode (PD) power point by managing a digital-to-analog converter (DAC) input value.

One embodiment of the present disclosure provides a system for facilitating the design of tunable optical filter circuits, the system comprising: a tunable optical filter; a tunable optical filter processing block comprising a power input measurement circuit in operative communication with the tunable optical filter, the power measurement input circuit comprising a plurality of modules, and a control logic module in operative communication with the power input measurement circuit; and at least one parameterizable register in operative communication with the plurality of modules comprising the power input measurement circuit, wherein the control logic module is configured to process an input from the power input measurement circuit and indicate how well the tunable optical filter is tuned to a wavelength of interest, and wherein the behavior of at least one of the plurality of modules in operative communication with the at least one parameterizable register may be altered by changing parameters of the parameterizable register.

Another embodiment of the present disclosure provides such a system for facilitating the design of tunable optical filter circuits, the system further comprising a photodetect diode in operative communication with the tunable optical filter and a transimpedance amplifier that is in operative communication with at least one nonlinear amplifier, wherein the nonlinear amplifier is in operative communication with the power input measurement circuit.

A further embodiment of the present disclosure provides such a system for facilitating the design of tunable optical filter circuits wherein the power input measurement circuit further comprises a log power summing amplifier sample measurement circuit disposed between the at least one nonlinear amplifier and the power input measurement circuit.

Yet another embodiment of the present disclosure provides such a system for facilitating the design of tunable optical filter circuits wherein the power input measurement circuit comprises a discrete Fourier transform module in operative communication with a log power calculation module configured to convert a complex result received from the discrete Fourier transform module to decibels of optical power.

A yet further embodiment of the present disclosure provides such a system wherein the power input measurement modules further comprise a video averaging module configured to perform smoothing and decimation of power measurements received from the log power calculation module.

Still another embodiment of the present disclosure provides such a system for facilitating the design of tunable optical filter circuits wherein the discrete Fourier transform module is a Goertzel discrete Fourier transform module.

A still further embodiment of the present disclosure provides such a system for facilitating the design of tunable optical filter circuits wherein the Goertzel discrete Fourier transform comprises an infinite impulse response filter configured to calculate the magnitude of a frequency bin discrete Fourier transform and act as a matched filter for fundamental harmonics relating to the envelope of a pulsed waveform.

Even another embodiment of the present disclosure provides such a system for facilitating the design of tunable optical filter circuits wherein an output of the control logic module is connected to the tunable optical filter through a differential output digital to analog converter configured to alter the response of the tunable optical filter.

An even further embodiment of the present disclosure provides such a system for facilitating the design of tunable optical filter circuits further comprising an analog to digital converter disposed between the at least one nonlinear amplifier and the power input measurement circuit.

A still even another embodiment of the present disclosure provides such a system for facilitating the design of tunable optical filter circuits wherein the power input measurement circuit modules comprise a discrete Fourier transform module and a log power calculation module.

A still even further embodiment of the present disclosure provides such a system for facilitating the design of tunable optical filter circuits wherein the log power calculation module is configured to convert a complex result received from the discrete Fourier transform module to decibels of optical power.

Still yet another embodiment of the present disclosure provides such a system for facilitating the design of tunable optical filter circuits wherein the power input measurement modules further comprise a video averaging module configured to perform smoothing and decimation of power measurements received from the log power calculation module.

A still yet further embodiment of the present disclosure provides such a system for facilitating the design of tunable optical filter circuits wherein the discrete Fourier transform module is a Goertzel discrete Fourier transform module.

Even yet another embodiment of the present disclosure provides such a system for facilitating the design of tunable optical filter circuits wherein each of the power measurement modules module is in bidirectional communication with the at least one parameterizable register.

An even yet further embodiment of the present disclosure provides such a system for facilitating the design of tunable optical filter circuits wherein each of the plurality of modules receives configuration information from and returns status and/or data to the internal register module.

Still even yet another embodiment of the present disclosure provides such a system for facilitating the design of tunable optical filter circuits wherein the tunable optical filter processing block is configured to process power data from the tunable optical filter and measure the amount of light that is modulated at an expected pulse frequency.

A still even yet further embodiment of the present disclosure provides such a system for facilitating the design of tunable optical filter circuits wherein the tunable optical filter processing block is incorporated into an application-specific integrated circuit.

Yet still even another embodiment of the present disclosure provides such a system for facilitating the design of tunable optical filter circuits wherein the tunable optical filter processing block is incorporated into a Field-Programmable Gate Array.

One embodiment of the present disclosure provides a system for facilitating the design of tunable optical filter circuits, the system comprising: a tunable optical filter; a photodetect diode in operative communication with the tunable optical filter; a transimpedance amplifier in operative communication with the photodetect diode; at least one nonlinear amplifier in operative communication with the transimpedance amplifier; a tunable optical filter processing block comprising a power input measurement circuit in operative communication with the nonlinear amplifier, the power measurement input circuit comprising a plurality of modules, including a Goertzel discrete Fourier transform module in operative communication with a log power calculation module configured to convert a complex result received from the Goertzel discrete Fourier transform module to decibels of optical power, the log power calculation module being in further operative communication with a video averaging module configured to perform smoothing and decimation of power measurements received from the log power calculation module, and a control logic module in operative communication with the power input measurement circuit; a log power summing amplifier sample measurement circuit disposed between the at least one nonlinear amplifier and the power input measurement circuit; and at least one parameterizable register in operative communication with the plurality of modules comprising the power input measurement circuit, wherein the control logic module is configured to process an input from the power input measurement circuit and indicate how well the tunable optical filter is tuned to a wavelength of interest, wherein the behavior of at least one of the plurality of modules in operative communication with the at least one parameterizable register may be altered by changing parameters of the parameterizable register, wherein an output of the control logic module is connected to the tunable optical filter through a differential output digital to analog converter configured to alter the response of the tunable optical filter, and wherein the Goertzel discrete Fourier transform comprises an infinite impulse response filter configured to calculate the magnitude of a frequency bin discrete Fourier transform and act as a matched filter for fundamental harmonics relating to the envelope of a pulsed waveform.

One embodiment of the present disclosure provides a system for facilitating the design of tunable optical filter circuits, the system comprising: a tunable optical filter; a photodetect diode in operative communication with the tunable optical filter; a transimpedance amplifier in operative communication with the photodetect diode; at least one nonlinear amplifier in operative communication with the transimpedance amplifier; a tunable optical filter processing block comprising a power input measurement circuit in operative communication with the nonlinear amplifier, the power measurement input circuit comprising a plurality of modules, including a Goertzel discrete Fourier transform module in operative communication with a log power calculation module configured to convert a complex result received from the Goertzel discrete Fourier transform module to decibels of optical power, the log power calculation module being in further operative communication with a video averaging module configured to perform smoothing and decimation of power measurements received from the log power calculation module, and a control logic module in operative communication with the power input measurement circuit; an analog to digital converter disposed between the at least one nonlinear amplifier and the power input measurement circuit; and at least one parameterizable register in operative communication with the plurality of modules comprising the power input measurement circuit, wherein the control logic module is configured to process an input from the power input measurement circuit and indicate how well the tunable optical filter is tuned to a wavelength of interest, wherein the behavior of at least one of the plurality of modules in operative communication with the at least one parameterizable register may be altered by changing parameters of the parameterizable register, wherein an output of the control logic module is connected to the tunable optical filter through a differential output digital to analog converter configured to alter the response of the tunable optical filter, and wherein the Goertzel discrete Fourier transform comprises an infinite impulse response filter configured to calculate the magnitude of a frequency bin discrete Fourier transform and act as a matched filter for fundamental harmonics relating to the envelope of a pulsed waveform.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The design of the power measurement circuitry 400 required to maintain the signal picked up by a Tunable Optical Filter (TOF) 502 typically requires bread boarding or other time consuming trial and error engineering to arrive at an optimal solution. By breaking up the power measurement circuitry 400 into separate modules that can be modified (i.e. configured) in software without complete reconstruction, development of associated circuitry and components can continue while the design is optimized. In embodiments, this is accomplished by breaking up power measurement input circuitry 400 into three separate blocks with parameterizable (i.e. configurable) registers or a single parameterizable register in communication with all three blocks, such as the internal register 310 depicted in various Figures herein. Additional registers are used in embodiments for the storage of data and status information.

The TOF processing block 300 disclosed herein provides flexibility in two key areas; power measurement input and software control. The TOF processing block 300 operates in the frequency domain and, provided a wavelength of interest, attempts to maintain the correct center of band once a signal is acquired, thereby maintaining the strongest possible data link. In embodiments, the Tunable Optical Filter (TOF) Processing Block 300 may be thought of as a set of algorithms executed by hardware and software, in embodiments on an ASIC containing an Optical Low Noise Amplifier (OLNA) sub-assembly.

In embodiments, the TOF Processing Block 300 processes raw power data from the TOF 502 and recovers the amount of light that is modulated at the expected pulse frequency, which is governed by the duty cycle of the communications link.

Figure 1:
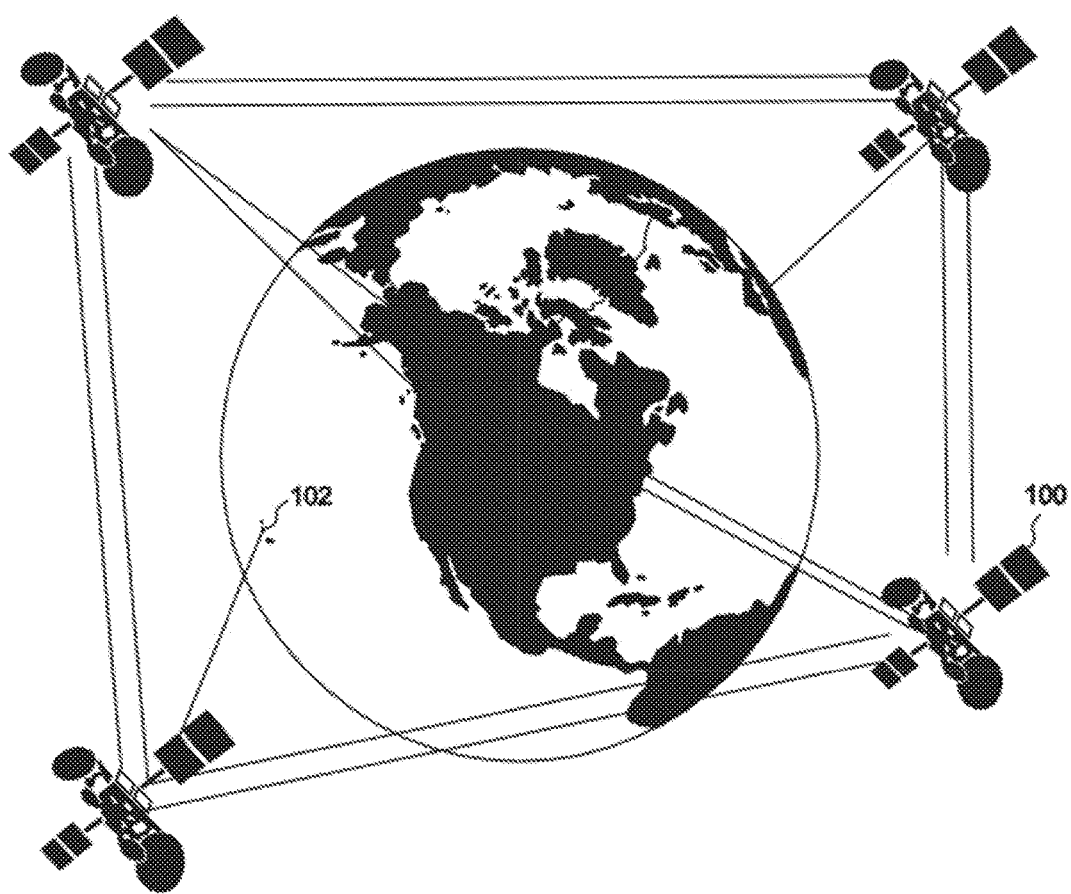
FIG. 1 illustrates laser-com between orbiting satellites, and between the satellites and ground-based nodes, in accordance with embodiments of the present disclosure.
Figure 2:
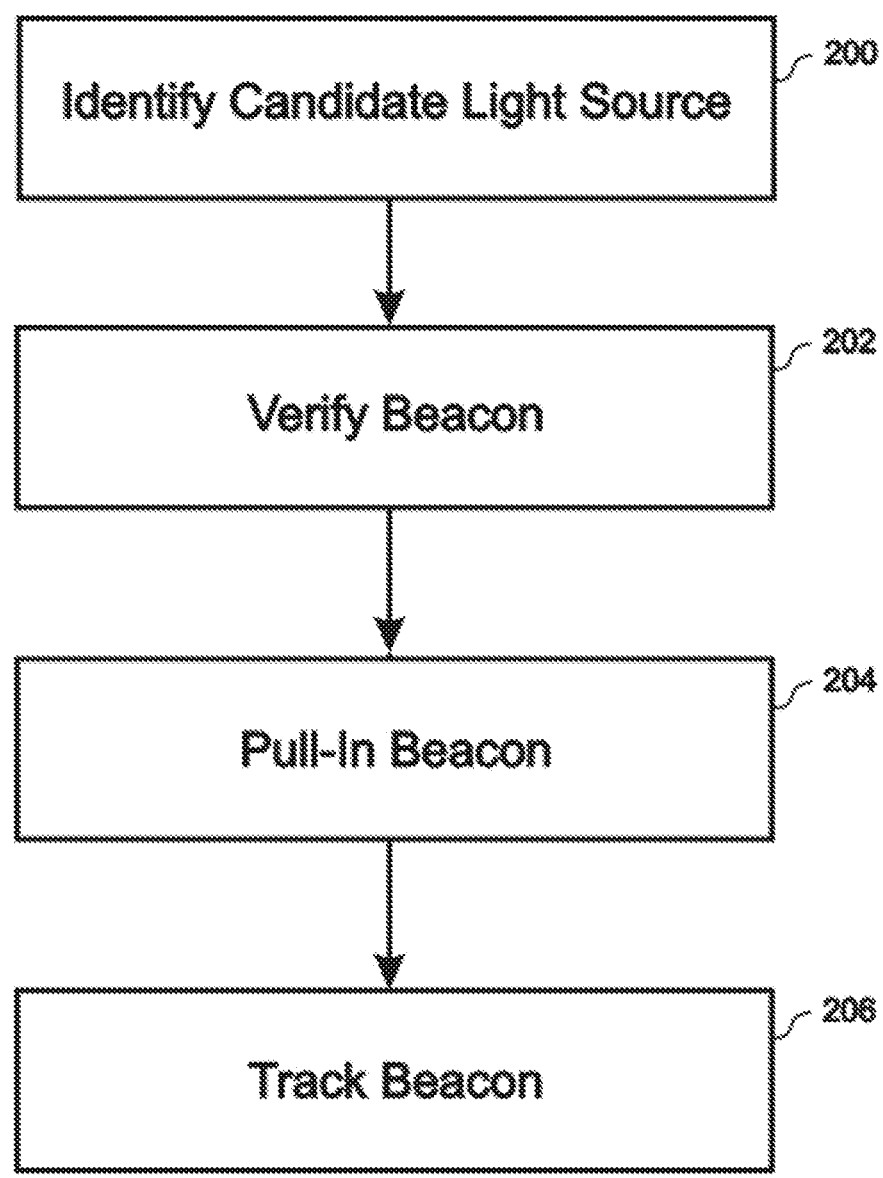
FIG. 2 is a flow diagram illustrating steps required for aligning a laser-com receiving system with a transmitting node, in accordance with embodiments of the present disclosure.
Figure 3:
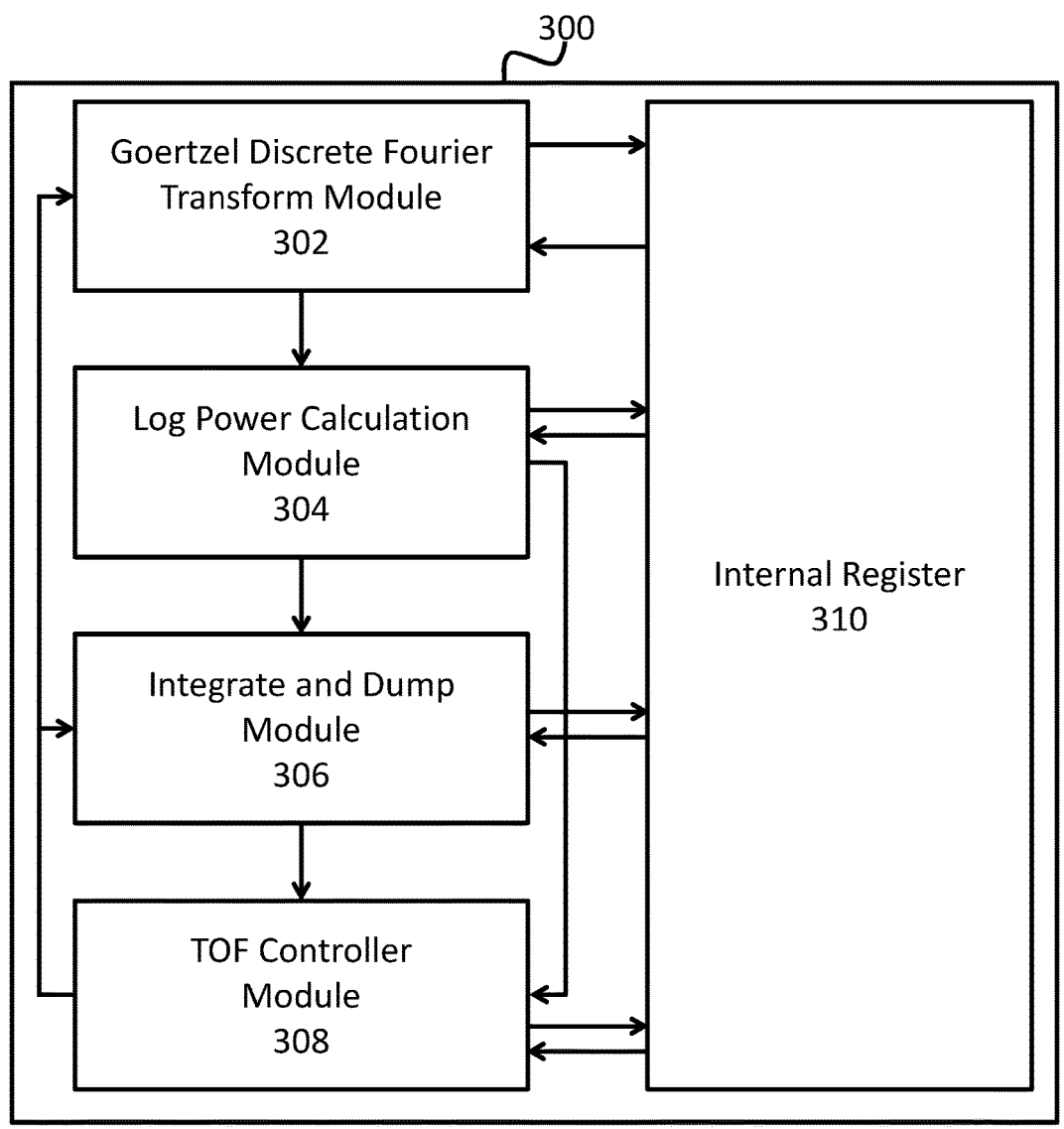
FIG. 3 is a schematic showing a tunable optical filter processing block, in accordance with embodiments of the present disclosure.

Now referring to FIG. 3, an embodiment of a TOF Processing Block 300 in accordance with the teachings of the present disclosure is shown. In embodiments, the TOF Processing Block 300 comprises a Discrete Fourier Transform (DFT) module 302, a log power calculation module 304, an integrate and dump module 306, and a TOF controller module 308, wherein each module receives configuration information from and returns status and/or data to the internal register module 310. In embodiments, the DFT module 302 is a Goertzel DFT module 302 that uses an infinite impulse response IIR filter to calculate the magnitude of a frequency bin DFT and acts as a matched filter for the fundamental (and any other selected harmonics) that come from the envelope of a pulsed waveform. It is very efficient for an ASIC implementation because only one multiply by a constant is needed for each iteration. One exemplary implementation is mathematically described below:

$$y_n = x_n + c*y_{n-1} - y_{n-2} \quad \text{(1a)—typical case}$$

$$y_n = x_n + y_{n-1} \quad \text{(1b)—CW case}$$

where
$x_n$ = the current sample $$c = 2*\cos\left(2*\pi*\frac{f_i}{f_s}\right) \quad (2)$$

$f_i$ = Frequency of interest
$f_s$ = Sampling Frequency
N = Number of samples used Assuming the values of y[−2] and y[−1] are zero, once N samples are complete, the phasor for the frequency bin is computed using the following relationships:

$$x_r = \cos\theta y_N - y_{N-1} \quad \text{(4a)—typical case}$$

$$x_r = y_N \quad \text{(4b)—CW case}$$

$$x_i = \sin\theta y_N \quad \text{(5a)—typical case}$$

$$x_i = 0 \quad \text{(5b)—CW case}$$

where:

$$\theta = 2*\pi*\frac{f_i}{f_s} \quad (6)$$

The update rate of the DFT, in embodiments, is $f_s/N$. Thus, if a 20 MHz sample rate is used, an N of 5000 would provide 4 kHz updates. During acquisition scanning, the rate may be closer to 1 kHz (N=20000). Note that, unlike a FFT algorithm, there is no advantage to having N be a power of 2.

To avoid numeric range problems, embodiments utilize a special "DC mode". While $f_i=0$ is a perfectly valid point for the algorithm in floating point, the value in the feedback register grows quadratically, which can stress a fixed point representation. In the DC case, the end result is simply the sum of the input points, for this reason, embodiments utilize a fixed-point algorithm to handle this case explicitly.

In embodiments, the DFT module 302 is also in direct, one way communication with the log power calculation module 304 and is configured to convert the complex result received from the DFT module 302 to decibels of optical power. An approximation of the magnitude can be achieved by using the sum of the absolute value of the larger term plus half the absolute value of the smaller term. In embodiments, a lookup table is used for the 80*log(mantissa). In embodiments, a 6 bit mantissa provides reasonable accuracy and requires a log table of only 32 entries.

The log power calculation module 304 of embodiments is further in direct, one way communication with the integrate and dump (i.e. video averaging) module 306, which is configured to perform simple smoothing and decimation of the power measurements received from the log power calculation module 304.

The log power calculation module 304 of embodiments is further in direct, one way communication with the TOF controller module 308, which itself is in direct, one way communication with the integrate and dump 306 and DFT 302 modules.

Figure 4:
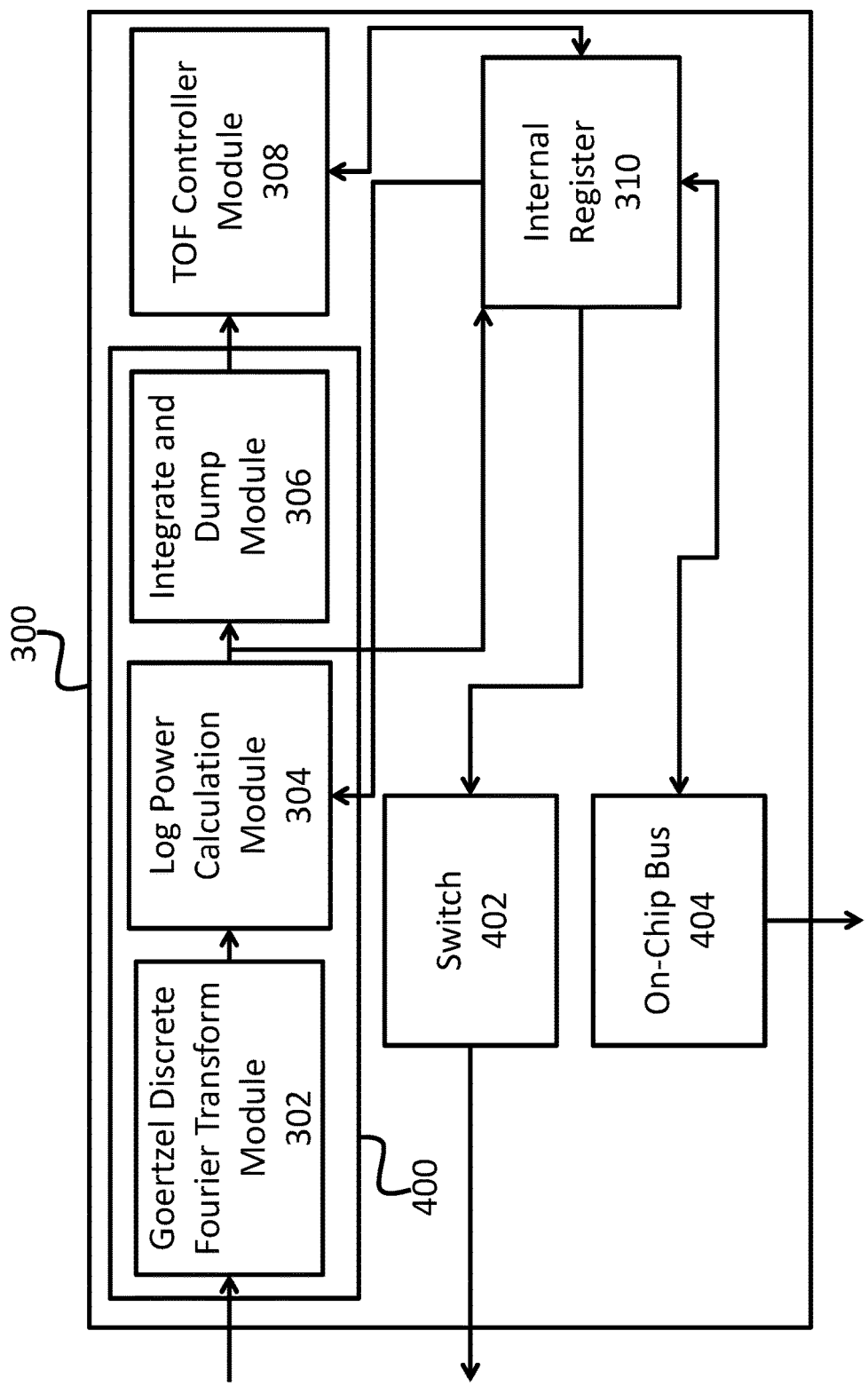
FIG. 4 is a schematic showing a tunable optical filter processing block, in accordance with embodiments of the present disclosure.

In embodiments, such as that shown in FIG. 4, the TOF processing block 300 comprises power measurement circuitry 400 that provides integrated power measurement to a control logic module 308, which indicates how well the Tunable Optical Filter (TOF) 502 is tuned to the wavelength of interest. Embodiments of the TOF Processing Block 300 disclosed herein allow power measurement circuitry 400 to take either of two forms: a photodiode (PD) sample measurement circuit 400, the output of which is a current proportional to input light intensity, or a log power summing amplifier sample measurement circuit.

Where a photodiode sample measurement circuit 400 is used, in embodiments, it is internally processed by a Discrete Fourier Transform (DFT) module 302 to determine power of the TOF output signal. In embodiments, the DFT module may be a Goertzel DFT module 302. In embodiments, the TOF Processing Block 300 primarily interacts with the sampled voltage from a PIN Photodiode, which is a part of the photodiode sample measurement circuit 400, and associated amplification circuitry. In such embodiments, the PD acts as an optical power meter, with a response filtered by the amplifier stages. In embodiments, the first stage of amplification is a transimpedance amplifier circuit (an operational amplifier with capacitive feedback) that can convert current to voltage with a reasonably high gain and bandwidth; additional standard amplification stages may follow.

Where a log power summing amplifier sample measurement approach is used, in embodiments, this technique requires more external circuitry, compared to the use of a photodiode sample measurement circuit 400, but eliminates the need for internal processing to determine the power of the TOF output signal. Additional external circuitry, in embodiments, comprises a summing amplifier connected to an A/D Converter (ADC) that is connected to a MeSH Core, a Multi-eSPI (Serial Peripheral Interface Bus) Core Handler (i.e. a digital logic design that allows synchronized communication with SPI slave devices, appropriate for applications that require sampling or output at a fixed rate without processor intervention), although similar devices would also be suitable, that is in communication with the Log Power Sampling Register 602. In embodiments, the ADC is a 12-bit ADC that is connected to the MeSH core through a Serial Peripheral Interface bus (SPI) I/F (interface) of the MeSH core.

The internal controller 308 of the TOF Processing Block 300 allows a system processor to have ultimate control of the TOF processing block 300 logic, but, in embodiments, offloads timing-critical and I/O-intensive portions of that logic from a system processor. This allows the system processor to handle many more tasks by greatly reducing its required frequency of interaction with the TOF control logic module 308. In embodiments, such interactions are reduced by approximately four orders of magnitude.

Figure 5:
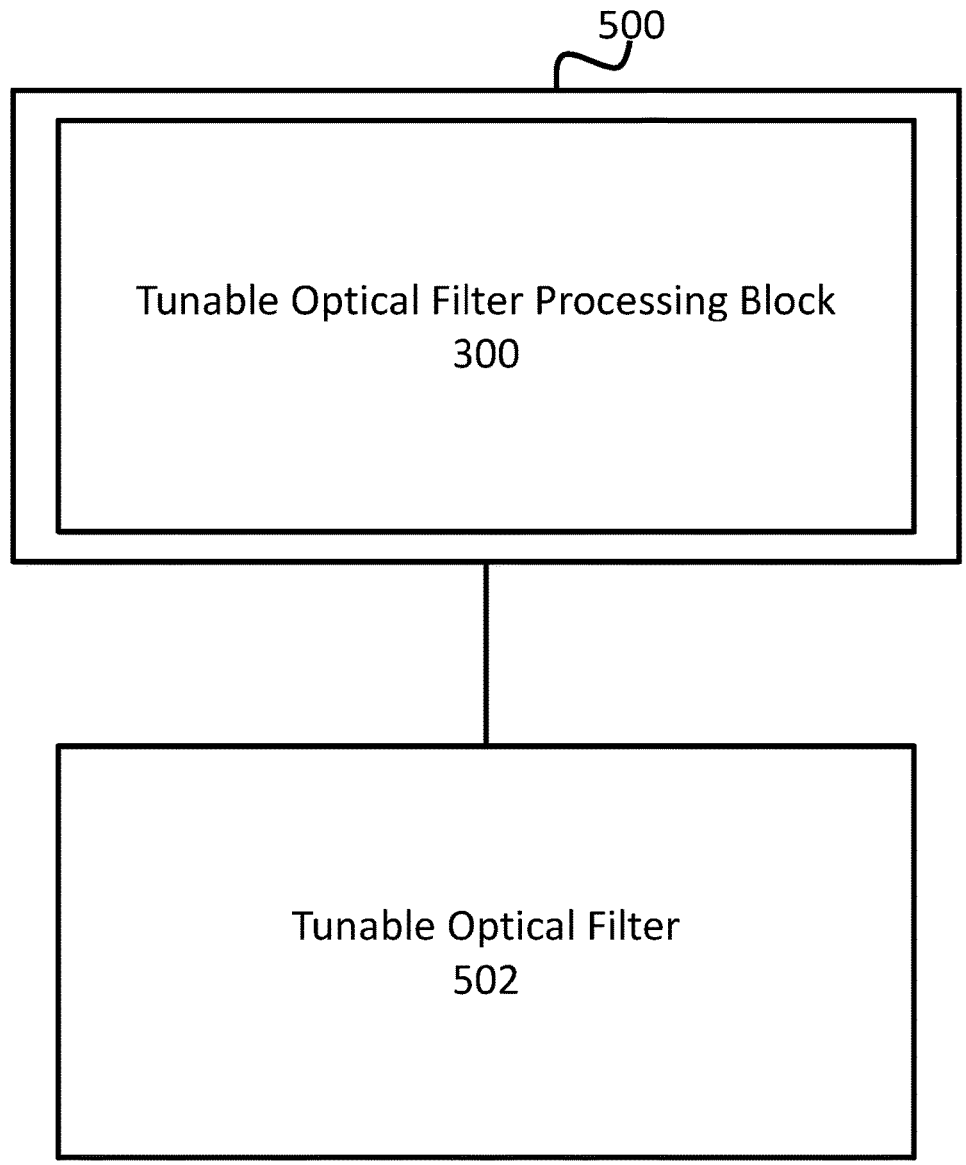
FIG. 5 is a schematic showing a tunable optical filter processing block incorporated into an ASIC and also showing a tunable optical filter connected thereto, in accordance with embodiments of the present disclosure.

Now referring to FIG. 5, the TOF processing block 300 is shown incorporated into an ASIC 500, which itself is in communication with a TOF 502, in accordance with embodiments of the present disclosure.

Figure 6:
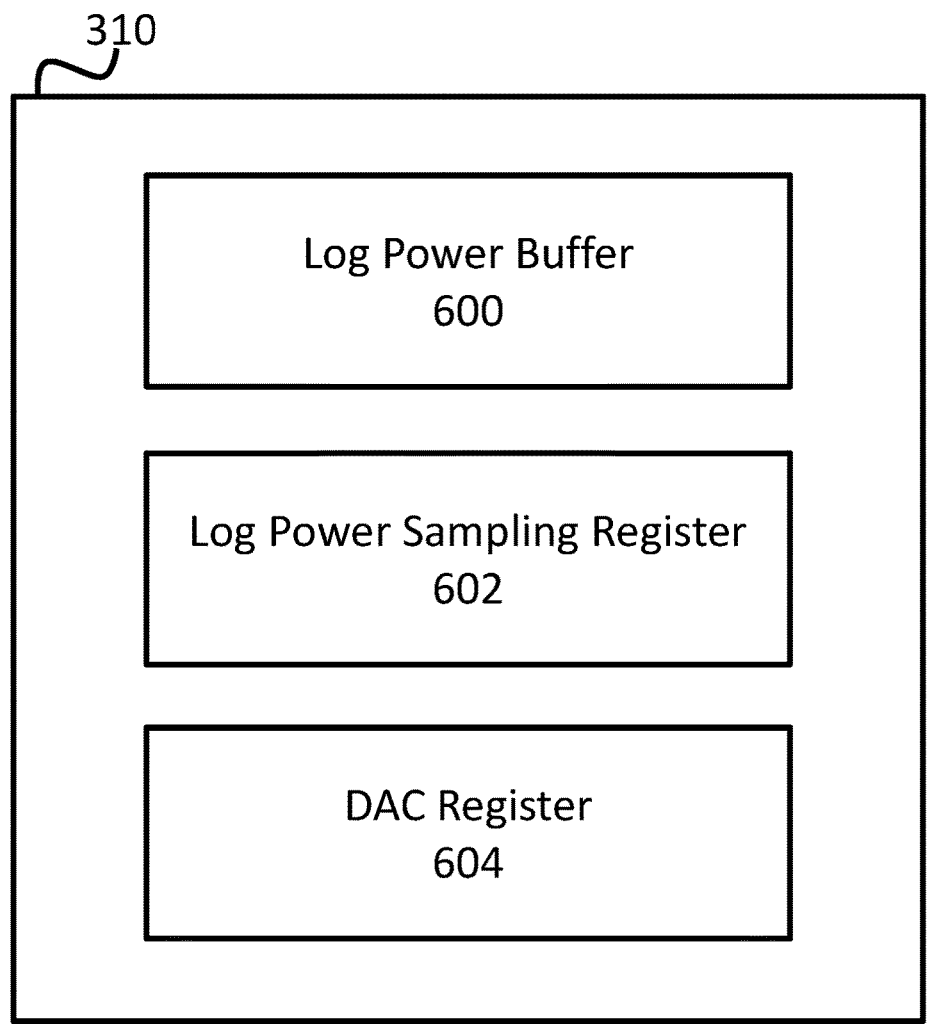
FIG. 6 is a schematic showing a tunable optical filter processing block incorporated into an ASIC, in accordance with embodiments of the present disclosure.

FIG. 6 shows the details of the internal register 310 shown in FIGS. 3 and 4, in accordance with embodiments. In embodiments, the internal register block 310 comprises a log power buffer 600, a log power sampling register 602, and a digital-to-analog converter (DAC) register 604. In such embodiments, the log power buffer 600 and log power sampling register 602 are in communication with the log power calculation module 304 and allow for the configuration thereof and/or storing of data relating thereto. For example, the log power buffer 600, in embodiments, is configured to store the most recent 4096 Log Power samples and may, in embodiments, be a Random Access Memory (RAM) module. Furthermore, in embodiments, the log power sampling register 602 contains two values: one is an alternate log power measurement, which is used when the 12-bit ADC path is used (thus that is an input to the Log Power Calculation block when that approach is used) and the other is a most recent log power sample, which is an output from the log power calculation module 304, regardless of which approach is used. In embodiments, the log power buffer 600 and log power sampling register 602 receive such data from the log power calculation module 304. Furthermore, the DAC register 604 of such embodiments is in communication with the integrate and dump module 306, allowing the configuration thereof. In embodiments, the DAC register 604 contains the value that is written by the MeSH core to the differential output DAC, for which a power measurement will be taken.

Figure 7:
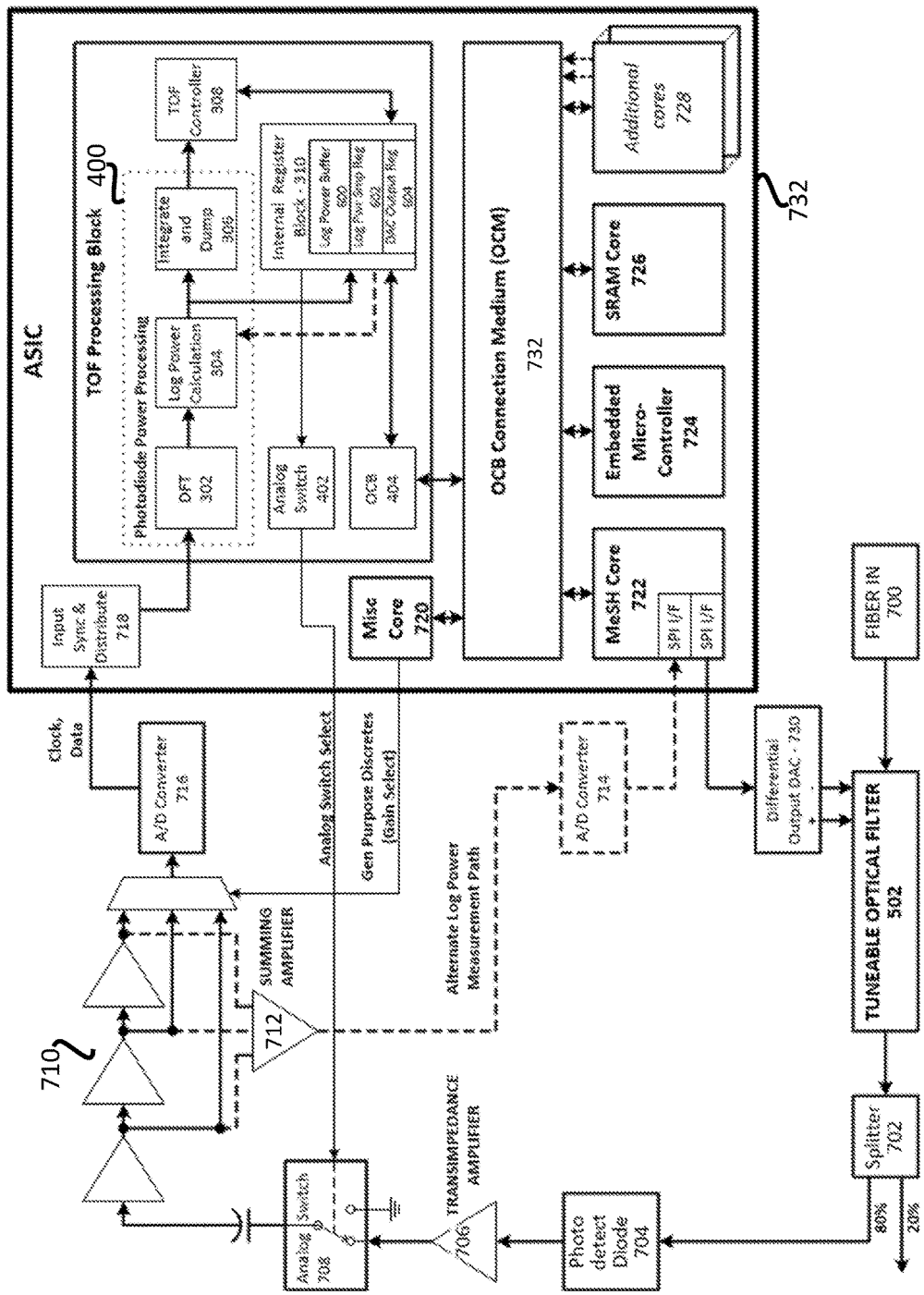
FIG. 7 is a schematic showing a tunable optical filter processing block incorporated into an ASIC connected to external circuitry used for signal processing, in accordance with embodiments of the present disclosure.

FIG. 7 is a schematic showing a tunable optical filter processing block incorporated into an ASIC 732 connected to external circuitry used for signal processing, in accordance with embodiments of the present disclosure. This figure shows the features of FIGS. 3-6 incorporated into a larger circuit configured in accordance with embodiments of the present disclosure, illustrating how the previously-described features might work together as part of a larger circuit. New elements shown in this figure include a fiber in module 700 in communication with the tunable optical filter 502, a splitter 702 configured to split a signal emanating from the tunable optical filter 502, which is connected a photodetect diode 704 that is connected to a transimpedance amplifier 706 connected to an analog switch 708 that is connected to at least one amplifier 710, which may be a non-linear amplifier 710. The non-linear amplifier 710, in embodiments, is connected to a summing amplifier 712 that is connected to an ADC 714, which is connected to a Mesh Core 722 that is connected to an OCB Connection Medium 732 in communication with an OCB 404. In embodiments, the Mesh Core 722 is also in communication with the tunable optical filter 502 through a differential output DAC 730. In embodiments, the OCB Connection Medium 732 is also connected to an Embedded Micro-Controller 724, an SRAM Core 726, a miscellaneous core 720, and additional cores 728. In embodiments, the non-linear amplifier 710 is connected to an ADC 716 that is connected to an input sync & distribute module 718 in communication with the discrete Fourier transform module 302.

In embodiments, the log power buffer 600 and log power sampling register 602 are registers containing outputs, such as status and data. In embodiments, the digital-to-analog converter (DAC) register 604 is a parameterizable register (i.e. a configuration register—a register used to configure the operation of a block of logic). In other embodiments, a single register may be used for all blocks that is both parameterizable and capable of storing outputs, such as status and data. In still other embodiments, a plurality of registers and fields may be employed that allow the configuration of, or enhance the configurability of, the TOF processing block 300.

In embodiments, the rates at which measurements need to be taken and calculations performed is too great for software to process directly. Given this limitation, in embodiments the TOF Processing Block 300 allows the processor in which the software runs to configure it to issue a control value to take the power measurement, so that the processor only needs to be involved at a much lesser level (e.g. once or twice a second, i.e. 1 or 2 Hz, instead of 4 KHz-20 MHz). In embodiments, this processor is an Embedded Micro-Controller (EMC).

In embodiments, all programmable features of the TOF Processing Block 300 are defined in software-accessible registers that are controlled by the EMC, which, in embodiments, is external to the TOF Processing Block 300 and accessed via an OCB.

In embodiments, primary configuration registers include a PD Power Processing Register and a TOF Controller Scan Parameters Register. These registers vary the DFT Length (N in the above equations), the Sum Count (control value referred to in paragraph 0048), and Scan parameters In embodiments, the TOF Controller Module 308 is configured to allow initialization and restarting of data acquisition relating to the TOF 502.

In embodiments, PD processing frequency is set via a parameterizable register.

In embodiments, Goertzel DFT length is a programmable number of input samples, in embodiments allowing up to 65536 samples.

In embodiments, the TOF Controller Module 308 uses summed PD power as an input.

In embodiments, log power average (LOG PWR) data captured by a log power buffer 600 is written to a circular buffer. In embodiments, the circular buffer saves the last 4096 samples and is readable via an On-Chip Bus (OCB).

The flexibility of the TOF Processing Block 300 disclosed herein allows system development to proceed without needing to wait for final decisions regarding a TOF control algorithm to be determined, thereby allowing for faster production and reduced research and development budgets.

It should be noted that the disclosure herein is mainly presented with reference to satellite communication. However, it will be understood by those of skill in the art that the present disclosure is not limited to satellite communication, but also applies to other implementations of laser communication.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A system for facilitating the design of tunable optical filter circuits, the system comprising:
   a tunable optical filter;
   a tunable optical filter processing block comprising a power input measurement circuit in operative communication with said tunable optical filter, said power measurement input circuit comprising a plurality of modules, and a control logic module in operative communication with said power input measurement circuit; and
   at least one parameterizable register in operative communication with said plurality of modules comprising said power input measurement circuit,
   wherein said control logic module is configured to process an input from said power input measurement circuit and indicate how well said tunable optical filter is tuned to a wavelength of interest,
   wherein the behavior of at least one of said plurality of modules in operative communication with said at least one parameterizable register may be altered by changing parameters of said parameterizable register, and
   wherein the tunable optical filter processing block is configured to process power data from the tunable optical filter and measure the amount of light that is modulated at an expected pulse frequency.

2. The system for facilitating the design of tunable optical filter circuits of claim 1, the system further comprising a photodetect diode in operative communication with said tunable optical filter and a transimpedance amplifier that is in operative communication with at least one nonlinear amplifier, wherein said nonlinear amplifier is in operative communication with said power input measurement circuit.

3. The system for facilitating the design of tunable optical filter circuits of claim 2 wherein said power input measurement circuit further comprises a log power summing amplifier sample measurement circuit disposed between said at least one nonlinear amplifier and said power input measurement circuit.

4. The system for facilitating the design of tunable optical filter circuits of claim 3 wherein said power input measurement circuit comprises a discrete Fourier transform module in operative communication with a log power calculation module configured to convert a complex result received from the discrete Fourier transform module to decibels of optical power.

5. The system of claim 4 wherein said power input measurement modules further comprise a video averaging module configured to perform smoothing and decimation of power measurements received from the log power calculation module.

6. The system for facilitating the design of tunable optical filter circuits of claim 5 wherein said discrete Fourier transform module is a Goertzel discrete Fourier transform module.

7. The system for facilitating the design of tunable optical filter circuits of claim 6 wherein said Goertzel discrete Fourier transform comprises an infinite impulse response filter configured to calculate the magnitude of a frequency bin discrete Fourier transform and act as a matched filter for fundamental harmonics relating to the envelope of a pulsed waveform.

8. The system for facilitating the design of tunable optical filter circuits of claim 7 wherein an output of said control logic module is connected to said tunable optical filter through a differential output digital to analog converter configured to alter the response of the tunable optical filter.

9. The system for facilitating the design of tunable optical filter circuits of claim 2 further comprising an analog to digital converter disposed between said at least one nonlinear amplifier and said power input measurement circuit.

10. The system for facilitating the design of tunable optical filter circuits of claim 9 wherein said power input measurement circuit modules comprise a discrete Fourier transform module and a log power calculation module.

11. The system for facilitating the design of tunable optical filter circuits of claim 10 wherein said log power calculation module is configured to convert a complex result received from the discrete Fourier transform module to decibels of optical power.

12. The system for facilitating the design of tunable optical filter circuits of claim 1 wherein said power input measurement modules further comprise a video averaging module configured to perform smoothing and decimation of power measurements received from the log power calculation module.

13. The system for facilitating the design of tunable optical filter circuits of claim 12 wherein said discrete Fourier transform module is a Goertzel discrete Fourier transform module.

14. The system for facilitating the design of tunable optical filter circuits of claim 13 wherein each of said power measurement modules module is in bidirectional communication with said at least one parameterizable register.

15. The system for facilitating the design of tunable optical filter circuits of claim 14 wherein each of said plurality of modules receives configuration information from and returns status and/or data to the internal register module.

16. The system for facilitating the design of tunable optical filter circuits of claim 1 wherein said tunable optical filter processing block is incorporated into an application-specific integrated circuit.

17. The system for facilitating the design of tunable optical filter circuits of claim 1 wherein said tunable optical filter processing block is incorporated into a Field-Programmable Gate Array.

18. A system for facilitating the design of tunable optical filter circuits, the system comprising:
- a tunable optical filter;
- a photodetect diode in operative communication with said tunable optical filter;
- a transimpedance amplifier in operative communication with said photodetect diode;
- at least one nonlinear amplifier in operative communication with said transimpedance amplifier;
- a tunable optical filter processing block comprising a power input measurement circuit in operative communication with said nonlinear amplifier, said power measurement input circuit comprising a plurality of modules, including a Goertzel discrete Fourier transform module in operative communication with a log power calculation module configured to convert a complex result received from the Goertzel discrete Fourier transform module to decibels of optical power, the log power calculation module being in further operative communication with a video averaging module configured to perform smoothing and decimation of power measurements received from the log power calculation module, and a control logic module in operative communication with said power input measurement circuit;
- a log power summing amplifier sample measurement circuit disposed between said at least one nonlinear amplifier and said power input measurement circuit; and
- at least one parameterizable register in operative communication with said plurality of modules comprising said power input measurement circuit,
- wherein said control logic module is configured to process an input from said power input measurement circuit and indicate how well said tunable optical filter is tuned to a wavelength of interest,
- wherein the behavior of at least one of said plurality of modules in operative communication with said at least one parameterizable register may be altered by changing parameters of said parameterizable register,
- wherein an output of said control logic module is connected to said tunable optical filter through a differential output digital to analog converter configured to alter the response of the tunable optical filter, and
- wherein said Goertzel discrete Fourier transform comprises an infinite impulse response filter configured to calculate the magnitude of a frequency bin discrete Fourier transform and act as a matched filter for fundamental harmonics relating to the envelope of a pulsed waveform.

19. A system for facilitating the design of tunable optical filter circuits, the system comprising:
- a tunable optical filter;
- a photodetect diode in operative communication with said tunable optical filter;
- a transimpedance amplifier in operative communication with said photodetect diode;
- at least one nonlinear amplifier in operative communication with said transimpedance amplifier;
- a tunable optical filter processing block comprising a power input measurement circuit in operative communication with said nonlinear amplifier, said power measurement input circuit comprising a plurality of modules, including a Goertzel discrete Fourier transform module in operative communication with a log power calculation module configured to convert a complex result received from the Goertzel discrete Fourier transform module to decibels of optical power, the log power calculation module being in further operative communication with a video averaging module configured to perform smoothing and decimation of power measurements received from the log power calculation module, and a control logic module in operative communication with said power input measurement circuit;
- an analog to digital converter disposed between said at least one nonlinear amplifier and said power input measurement circuit; and
- at least one parameterizable register in operative communication with said plurality of modules comprising said power input measurement circuit,
- wherein said control logic module is configured to process an input from said power input measurement circuit and indicate how well said tunable optical filter is tuned to a wavelength of interest,
- wherein the behavior of at least one of said plurality of modules in operative communication with said at least one parameterizable register may be altered by changing parameters of said parameterizable register,
- wherein an output of said control logic module is connected to said tunable optical filter through a differential output digital to analog converter configured to alter the response of the tunable optical filter, and
- wherein said Goertzel discrete Fourier transform comprises an infinite impulse response filter configured to calculate the magnitude of a frequency bin discrete Fourier transform and act as a matched filter for fundamental harmonics relating to the envelope of a pulsed waveform.

* * * * *